May 5, 1964 R. J. SUTTON 3,132,081
CATHODIC PROTECTION FOR WATER STORAGE TANKS
Filed April 28, 1961

INVENTOR.
ROBERT J. SUTTON
BY
Marvin M. Chaban
ATTORNEY

United States Patent Office 3,132,081
Patented May 5, 1964

3,132,081
CATHODIC PROTECTION FOR WATER
STORAGE TANKS
Robert J. Sutton, Chicago, Ill., assignor to General
Electric Company, a corporation of New York
Filed Apr. 28, 1961, Ser. No. 106,354
2 Claims. (Cl. 204—196)

The present invention relates to water storage tanks and more particularly to cathodic protection for such tanks.

It is an object of the invention to provide a powered anode for use in a water storage tank which has means associated with the anode for deenergizing the anode on the accumulation of an excessive amount of gas in the tank.

It is a further object of the invention to provide a plurality of electrodes depending into a water storage tank, and to utilize one pair of said plurality of electrodes to complete a series circuit through the water content of the tank for the energization of a third electrode, whereupon if for any reason the gap between the paired electrodes becomes dry, the energization of said third electrode is interrupted.

It is a further object to provide a powered anode extending axially into a water storage tank for corrosion protection, the energizing circuit of which includes a pair of liquid sensing anodes depending into said tank to greatly increase the series resistance and thereby greatly decrease the voltage in the circuit to the powered anode on formation of a pocket of gas in the tank.

Apparatus illustrative of an application of this invention includes a storage tank, such as a water heater tank, of the type in which steel plate is formed into the shape of an upright cylinder. The interior of the tank is protectively coated with suitable lining material such as glass or porcelain. It is generally known and conceded that even the best commercially producible linings are imperfect and contain many small holes or holidays. To protect the tank from corrosion or pitting at these holes, there may be used an anode extending into the tank interior. These anodes generally fall into one of two categories which may in general terms be called sacrificial and non-sacrificial. Sacrificial anodes are those fabricated of magnesium or similar metals having a suitable electrochemical relationship with the steel of the tank, whereby the resultant battery generates current causing the metal of the anode to plate out a protective film on exposed portions of the tank lining. Non-sacrificial or powdered anodes are those which employ a noble metal such as platinum, titanium, tantalum or columbium. In such arrangements, there is no adequate electro-mechanical battery established, and the anode is made electrically positive by impressing thereon a small direct-current voltage of positive polarity. The amount of the impressed voltage is dependent, among other things, on the quality and material in the tank lining, and the electrical conductivity of the water within the tank.

It is well known that with either type of anode, electrolysis of the water generates quite substantial amounts of hydrogen and oxygen gas. Under conditions of normal draw-off of water, the generated gas is continuously dissipated, but in the circumstance of prolonged stand-by conditions with little or no draw-off, the gases can accumulate in a substantial pocket at the top of the tank. These pockets have been known to cause explosions and the like, a fact which various safety codes have recognized and attempted to regulate.

One method of dissipating the gas is to prevent the further generation of gas while allowing a longer period for the gas already formed to be absorbed or dissolved in the water in the tank. It is to this method that the present invention applies.

Specifically, the present invention employs a non-sacrificial or powered anode which preferably may be platinum, titanium, or platinum-clad titanium and extends a considerable distance into the water of the tank to provide cathodic protection against corrosion of the interior tank walls. Further, the energizing circuit to the anode includes a serial path through a pair of electrodes extending a short distance into the portion of the tank within which the gas will accumulate. The circuit to the anode is normally completed through the water in which the pair of electrodes is immersed; and as this water is displaced by the accumulating gas, the circuit to the anode is interrupted so that no additional gas is formed and the gas already formed may be dissipated.

The invention both as to its organization and principle of operation together with further objects and advantages thereof, will best be understood by reference to the following specification taken in conjunction with the drawings in which.

Figure 1:
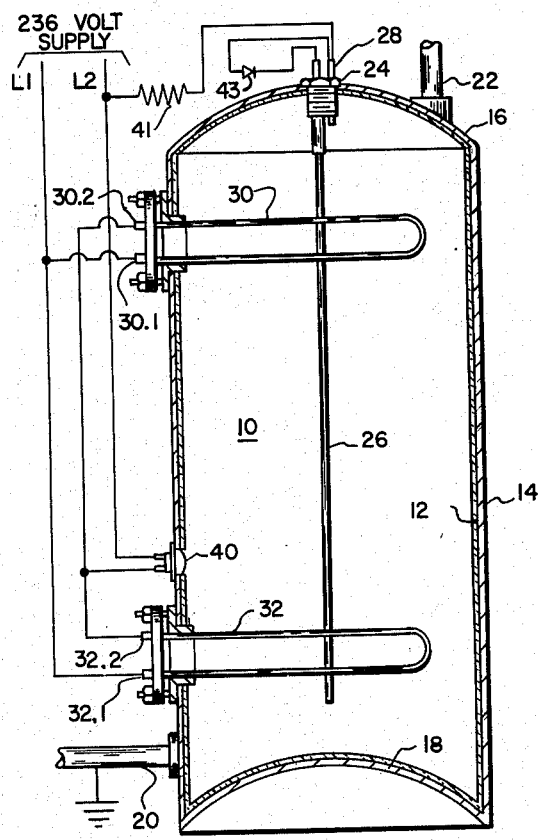
FIG. 1 is a side sectional elevation of a water heater tank employing my invention.
Figure 2:
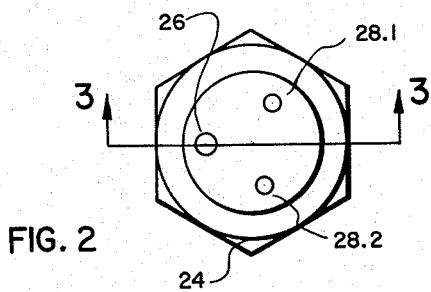
FIG. 2 is a top plan view of the electrode mounting structure.

Referring to the drawings, especially FIG. 1, there is shown a water heater designated 10 including a steel tank 12 comprising a cylindrical, vertical sidewall 14 and upper and lower heads 16 and 18 respectively. The tank 12 is provided with an inlet water pipe 20 which may be secured in threaded or other suitable engagement with an opening in the lower portion of sidewall 14. The upper end head 16 is provided with an outlet water pipe 22 which is used to draw off the heated water in a generally known manner. In the usual installation, the tank itself will be electrically connected to ground by way of the metal inlet and outlet pipes. In any other situation, the tank should be electrically grounded by a conventional grounding rod or equivalent circuit means (not shown). The upper head 16 may be domed in shape, the apex of the dome being provided with a centrally disposed threaded opening into which is inserted an anode bearing structure 24. This anode structure which may be threaded into the opening includes an anode 26, the powered anode previously referred to, which extends downwardly into the tank along the axis thereof, to within a short distance of the lower head 18. A pair of electrodes, 28.1 and 28.2, are also borne by structure 24 to extend downwardly into the tank for a short distance. Preferably, the electrodes have about one fourth of an inch immersed in the water under normal conditions. These electrodes preferably should be spaced apart by about ⅜ of an inch center to center distance and each should be of about ⅛ of an inch in diameter for maximum effectiveness. The electrodes and the anode are insulated from the tank and from one another within the structure 24 in any suitable manner. The anode 26 is of the non-sacrificial type which optionally may be fabricated from titanium, platinum-clad titanium or other suitable metals which are considered to be insoluble in water. It will be understood that the invention is applicable to the protection of water storage tanks as such, and not specifically to those comprising an element of a storage type water heater. Also, it is not related to any specific method of heating water although the power circuit for the heating units of an electric water heater makes power easily available for the powered anode 26.

The tank sidewall 14 is illustrated as having openings through which horizontally disposed heating units such as 30 and 32 are inserted. As can be seen in FIG. 1, the two heating units 30 and 32 are spaced from one another in the vertical sense and each extends substantially across the tank for efficient heat transfer to the water within the tank.

Each of the heating units comprises a helical resistance conductor housed in a rigid metallic sheath and insulated from the sheath by a highly compacted mass of suitable heat conducting and electrically insulating material such as powdered magnesium oxide. Each heating unit is configured into a U shape for immersion within the tank, the free ends of the U extending from the tank sidewall 14 for connection to a suitable power source. The sidewall of the tank is suitably sealed about the juncture of the heating units and the adjacent wall so that the tank is retentive of the water contained therein even at substantially elevated water temperatures and pressures.

To minimize corrosion of the tank, a coating of glass, porcelain, or other suitable non-corrosive material is bonded to the inner walls of the tank in any generally known manner. Further, the seals about the heating units should electrically insulate the units and the junction area from the tank to minimize the galvanic effects at the line of joinder of the ferrous metal tank and the brass of similar metal of the heating unit sheath and mounting. This insulation also serves to prevent the excess flow of cathodic current to the grounded sheath of the unit. These linings and insulation at best are somewhat less than perfect, and cathodic protection in the form of the anode 26 is used to prevent the electro-galvanic deterioration of any tank wall portion which may be exposed to the water because of holidays or imperfections in the tank lining.

In a tank of the illustrated type, a typical powered anode utilizes approximately 10 milliamperes of current at about 5 volts. The power so supplied has been found sufficient to maintain exposed tank wall areas electrically negative, and thus prevent corrosion in a porcelain-lined steel tank where the exposed or unlined area is as much as 2 square inches. A good commercial quality porcelain-lined tank usually has somewhat less exposed area. It is also well known that a powered anode generates oxygen gas at the anode and hydrogen gas at the exposed tank wall, which comprises the cathode in the electrical circuit.

By test it has been found that in a conventional glass-lined water heater tank containing Chicago (Ill.) tap water, a powdered anode using the above listed circuit parameters will generate 25 cubic centimeters of gas during a 24-hour period. The gas composition comprises, in a typical analysis, 41.5% hydrogen, 17.8% oxygen, 0.4% carbon dioxide, with the remainder substantially nitrogen.

During normal usage of the water tank with water being drawn off several times per day, the gases ($H_2$), ($H^+$) and $O_2$ are absorbed and removed by the water. When the tank is maintained in a standby condition, i.e., operating but no liquid being drawn off, the generated gases first saturate the static liquid stored within the tank. If no water is drawn off at this stage, an excess of gas accumulates and will rise to the highest point within the tank. In the illustrated apparatus this will be in the area occupied by the electrodes adjacent domed head 16. If gas continues to accumulate, as may happen when the owners of the home containing the water heater are away for a protracted period of time, a considerable possibility of explosion would exist. It is to alleviate this possibility that the present construction comes into play.

In FIG. 1 there can be seen a simple energizing circuit to perform the desired function. There is provided a 236 volt source, one lead (L1) of which is connected in parallel to the lower conductors 30.1 and 32.1 respectively of the heating units 30 and 32. The other conductors 30.2 and 32.2 are connected in parallel to one lead of thermostat 40, which is a maximum temperature limiting thermostat and functions in a known manner to cycle heaters 30 and 32. The other lead from the thermostat completes the energizing path for the heaters to lead L2, placing the heaters under the control of thermostat 40.

From lead L2 there may be traced a second circuit connected to resistor 41 which serves to limit the current and voltage applied to anode 26. So long as the electrodes 28.1 and 28.2 are immersed in water, the current path is connected serially through electrodes 28 and diode 43 to anode 26. From anode 26, the current will escape to ground by way of any tank wall areas which are exposed because of holes in the inner tank lining. The current to the electrodes and the anode is, of course, positive polarity direct current due to the rectifying action of diode 43 and the current and voltage to the anode are limited by the resistance of resistor 41 to within acceptable limits.

Figure 4:
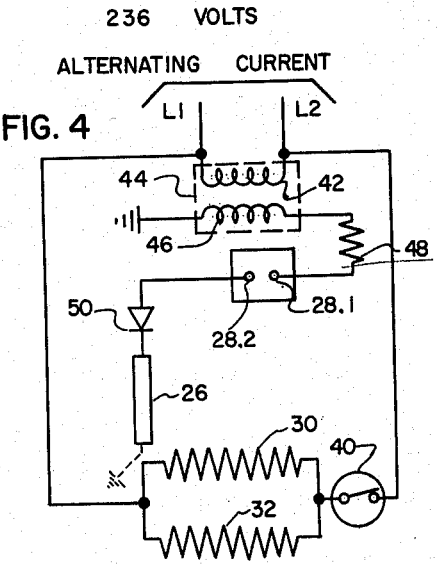
FIG. 4 is a diagrammatic representation of a control circuit.

In FIG. 4, there is shown an alternate form of energizing circuit for the water heater which again is connected to a 236 volt alternating current source with its leads labeled L1 and L2 in the conventional manner. Across leads L1 and L2 there is developed the 236 volts which is connected to the heating units 30 and 32 through the serially connected and normally closed thermostat 40. Naturally, the heating units, both upper and lower, are connected in parallel to share the 236 volt input.

Across the conductors L1 and L2, there is connected the primary 42 of a transformer 44. Various impedance balancing components may prove beneficial in the transformer primary; no such devices have been shown herein to keep from unduly complicating the disclosure. The transformer is used to reduce the applied voltage to the optimum value for energizing the powered anode. The energizing circuit for the powered anode may be traced from ground through the transformer secondary 46, current limiting resistor 48, electrode 28.1, the liquid filled gap, electrode 28.2, rectifier 50, to the powered anode 26. The circuit is completed from the anode to any exposed tank lining and subsequently to ground. This circuit, it should be noted, would be completed only during the periods in which rectified direct current was transmitted through rectifier 50. During the other half cycle, of course, no current will flow through the rectifier in its blocking state. Once again, it should be noted that positive polarity direct current must be applied to the powered anode, hence the use of rectifier 50.

Figure 3:
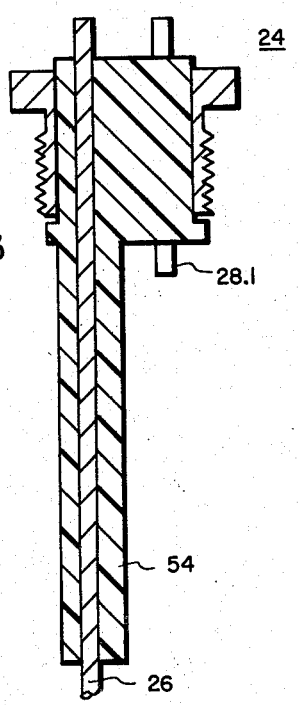
FIG. 3 is a sectional view taken along the lines 3—3 of FIG. 2.

In viewing FIG. 3, it can be seen that anode 26 is covered by insulating tube 54 to a position sufficiently remote from the electrode pair to prevent a flow of current from electrodes 28 through the tank contents to anode 26. The electrodes themselves are physically positioned quite close together to minimize the voltage drop through the water between the electrodes. However, when the water is displaced by electrolyzed gas, the resistance between electrodes tends toward the infinite and successively lesser amounts of power are transmitted to power anode 26.

Repeating, the energizing circuit to powered anode 26 includes a conductive path through the water in the tank. The powered anode tends to electrolyze the water, thereby continuously generating gas. With continual drain-off of water, this gas is absorbed into the water. When water has not been drawn off for a protracted period, which may be upwards of two to three weeks, the water becomes saturated with generated gas and a gas pocket begins to form. Electrodes 28.1 and 28.2 are physically positioned at the uppermost extent of the tank interior so that they will be within the space within which the gas first accumulates. As the water recedes below the electrodes, the resistance between electrodes 28 becomes almost infinite and flow of current to anode 26 is cut off. Thus, no additional gas is formed and the gas which has been already formed slowly dissipates. The status quo, little or no gas being formed and retained in the tank, is thereby maintained. When finally, the gas-saturated water is drawn off and fresh water enters the tank, the anode may be operated for a considerable period with no gas accumulation.

Parenthetically, it should be noted that the electrode series path passes such a low voltage (5 volts) and low amperage (10 milliamps) that on opening of the circuit (following formation of a gas pocket) no arc can be generated to accidentally ignite the explosive gas adjacent to the electrodes.

While there has been described what is at present considered to be the preferred embodiments of the invention, it will be understood that it is intended to cover in the appended claims all modifications which fall within the true spirit and scope of the invention.

What is claimed is:

1. For use with a ferrous metal tank adapted to contain water under pressure, said tank having a lining of electrically insulating galvanically inert material, a mechanism for cathodically protecting against corrosion any metal of the tank exposed to the water content thereof by holidays in said lining, comprising:
   (A) a body of water impervious electrical insulating material extending through a wall of said tank at a high point thereof,
   (B) an anode extending through said body and having an elongated portion of noble metal arranged to be immersed in the water content of said tank throughout substantially the depth of said tank,
   (C) first and second electrodes extending through said body at a high point of said tank in electrically insulated relationship with each other and with said anode, said first and second electrodes being spaced to define a gap therebetween, each of said electrodes presenting an exposed conductor portion terminating at a high point of said tank and arranged to be immersed in the water content of said tank to a depth dependent upon the accumulation of gas at the high point of said tank,
   (D) a sleeve of insulation material disposed about said anode adjacent said electrode and arranged to extend into the water content of the tank for a distance substantially below the bottom of said electrodes to interpose a high electrical resistance path between either of said electrodes and said anode,
   (E) means for electrically grounding said tank,
   (F) series circuit means including rectifier means and said first and second electrodes serially connected between a source of power and said anode to apply positive polarity, low voltage, low amperage electrical energy to said anode through said gap between said first and second electrodes,
   (G) whereby the series circuit is completed only through the gap between said first and second electrodes and reduction of the level of immersion of said electrodes resulting from an accumulation of gas at the high point of the tank effects a gradual increase in the resistance of said series circuit.

2. The cathodic protection mechanism according to claim 1, in which under conditions of substantially no gas accumulation above the water in the tank the said first and second electrodes have approximately one quarter inch immersion and the face-to-face spacing between the immersed portions of said electrodes is not greater than said depth of immersion.

References Cited in the file of this patent

UNITED STATES PATENTS

| | | |
|---|---|---|
| 1,506,306 | Kirkaldy | Aug. 26, 1924 |
| 1,877,389 | Daum | Sept. 13, 1932 |
| 2,025,243 | Jackson et al. | Dec. 24, 1935 |
| 2,128,331 | Schlotter | Aug. 30, 1938 |
| 2,221,997 | Polin | Nov. 19, 1940 |
| 2,752,308 | Andrus | June 26, 1956 |
| 2,893,938 | Bremerman | July 7, 1959 |
| 2,918,420 | Sabius | Dec. 22, 1959 |
| 2,996,445 | Eisenberg et al. | Aug. 15, 1961 |